Figure 1:
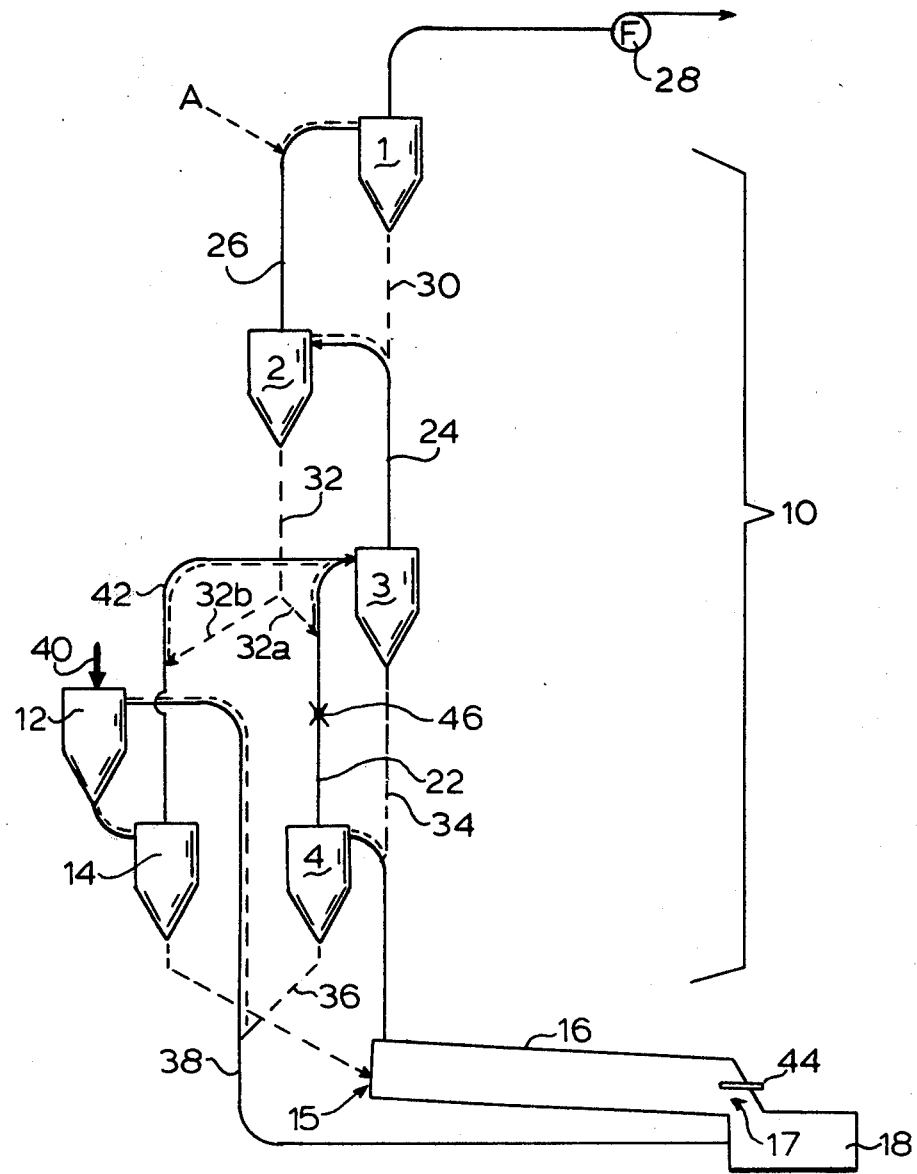

United States Patent [19]

Dambrine et al.

[11] 4,427,377
[45] Jan. 24, 1984

[54] INSTALLATION FOR THE DRY MANUFACTURE OF CEMENT

[75] Inventors: Francis Dambrine, Louveciennes; Gérard Ghestem, Santes, both of France

[73] Assignee: Fives-Cail Babcock, Paris, France

[21] Appl. No.: 280,540

[22] Filed: Jul. 6, 1981

[30] Foreign Application Priority Data

Jul. 9, 1980 [FR] France .................. 80 15236

[51] Int. Cl.³ .............................. F27B 7/02
[52] U.S. Cl. .................... 432/106; 106/100
[58] Field of Search ............ 432/14, 106; 106/100

[56] References Cited

U.S. PATENT DOCUMENTS 3,975,148 8/1976 Fukuda et al. ............ 432/106
4,039,277 8/1977 Kobayashi et al. ......... 432/106
4,050,882 9/1977 Kohl et al. ............... 432/106

Primary Examiner—John J. Camby
Attorney, Agent, or Firm—Kurt Kelman

[57] ABSTRACT

An installation for the dry manufacture of cement comprises a preheater heat-exchange unit of series-connected cyclones, a precalcination kiln and another cyclone associated therewith, a clinkerization kiln and a clinker cooling chamber associated with this kiln. To distribute the hot air coming from the cooling chamber suitably between the precalcination and clinkerization kilns, a device is provided for creating a gas pressure loss in the circuit between the last cyclone of the preheater and a point where a smoke gas outlet conduit of the cyclone associated with the precalcination kiln is connected to the circuit downstream of the last cyclone.

7 Claims, 3 Drawing Figures

INSTALLATION FOR THE DRY MANUFACTURE OF CEMENT

The present invention relates to an installation for the dry manufacture of cement, which comprises a clinkerization kiln having an inlet for precalcined cement raw material, an outlet for clinker produced in the kiln from the precalcined cement raw material and an outlet conduit for smoke gas generated in the kiln during clinkerization, a cooling chamber for the clinker having an inlet connected to the clinker outlet of the klin and an outlet conduit for hot air generated in the cooling chamber during cooling of the clinker, a preheater heat-exchange unit comprised of a plurality of cyclones series-connected in a circuit and including a last one of the cyclones, the preheater heat-exchange unit being connected to the smoke gas outlet conduit and receiving the smoke gas therefrom, means for circulating a current of the smoke gas through the preheater heat-exchange unit circuit in one direction, and means for feeding the cement raw material into the circuit for counter-current flow therethrough.

It is known to arrange in such an installation a precalcination kiln having an inlet connected to the hot air outlet conduit for receiving a portion of the hot air and the preheated cement raw material, the hot air portion received in the precalcination kiln being utilized therein as combustion air and another portion of the hot air being fed as secondary air into the clinkerization kiln, the preheated cement raw material being precalcined in suspension in the precalcination kiln and the precalcination kiln having an outlet for the precalcined cement raw material and smoke gas generated during precalcining. Finely divided or atomized fuel is injected into the material floating in suspension in the precalcination kiln and another cyclone has an inlet connected to the outlet of the precalcination kiln for receiving the precalcined cement raw material and smoke gas therefrom and for separating the precalcined cement raw material from the smoke gas. The other cyclone has an outlet conduit for the smoke gas connected to the preheater heat-exchange unit circuit, the smoke gases from the kilns being utilized in the circuit for preheating the cement raw material, and an outlet for the precalcined cement raw material connected to the inlet of the clinkerization kiln. The precalcined cement raw material is converted into clinker in the latter kiln.

In such installation, the hot air circulation and the smoke gas current are assured by a single circulating means consisting of an exhaust fan whose input is connected to an outlet of a first one of the cyclones of the preheater heat-exchange unit. Between the cooling chamber and the point where the outlet conduit of the other cyclone is connected to the preheater heat-exchange unit, the smoke gas and the hot air follow parallel paths constituted by the precalcination kiln and a part of the unit, on the one hand, and the hot air outlet conduit, the precalcination kiln and the other cyclone, on the other hand. Due to the fact that the gas flow through the first path is slightly less than that through the second path and because of the nature of the two parallel paths, the pressure losses are stronger in the second than in the first path, particularly since the conduit connecting the cooling chamber to the precalcination kiln has a much smaller cross section than the rotary kiln of clinkerization.

Various means have been proposed to equalize these pressure losses in the two gas flow paths. In practice, the use of an exhaust fan in the conduit connecting the cooling chamber to the precalcination kiln has not been found to be feasible because the air circulating therein is too hot and charged with dust particles causing a rapid deterioration of the fan. Another proposal has been to arrange a constriction in the flue connecting the clinkerization kiln to the last cyclone of the preheater heat-exchange unit to increase the pressure loss therein. However, this has not been found to be entirely satisfactory because, since the temperature of the smoke gas in the outlet flue is elevated, some particles suspended in the smoke gas are subject to fusion, which makes them sticky, causing deposits to be formed on the wall of the flue at the level of the constriction. These wall deposits interfere with the proper operation of the installation and require its interruption for intermittent cleaning.

It is the primary object of this invention to solve these and other problems in a novel manner.

The above and other objects are accomplished in an installation of the described type according to the invention by connecting the smoke gas outlet conduit of the other cyclone to the preheater heat-exchange unit circuit at a point downstream of the last cyclone of the preheater heat-exchange unit in the one direction, and providing a device for creating a gas pressure loss in the circuit between the last cyclone of the preheater heat-exchange unit and this point.

Figure 2:
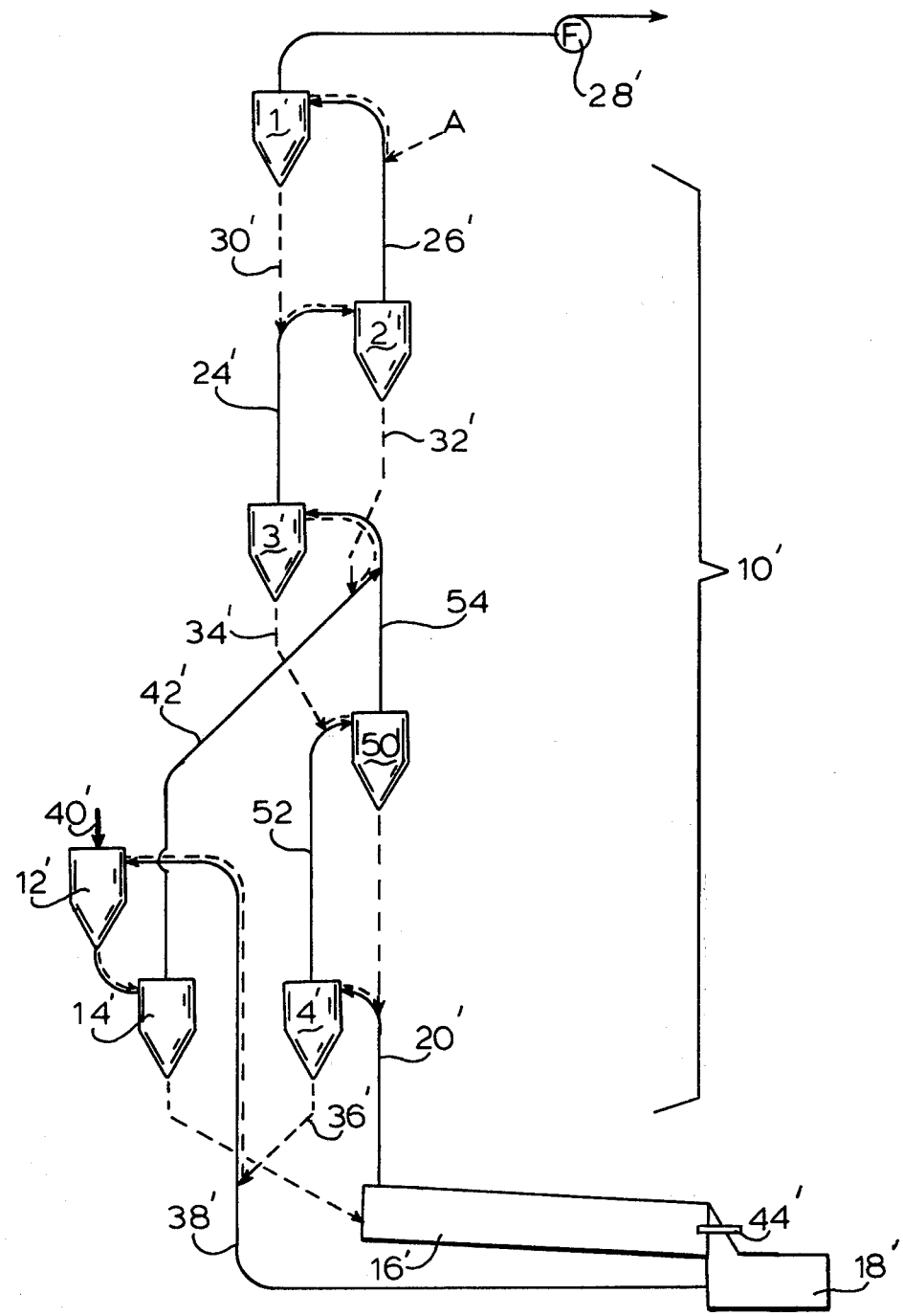
Figure 3:
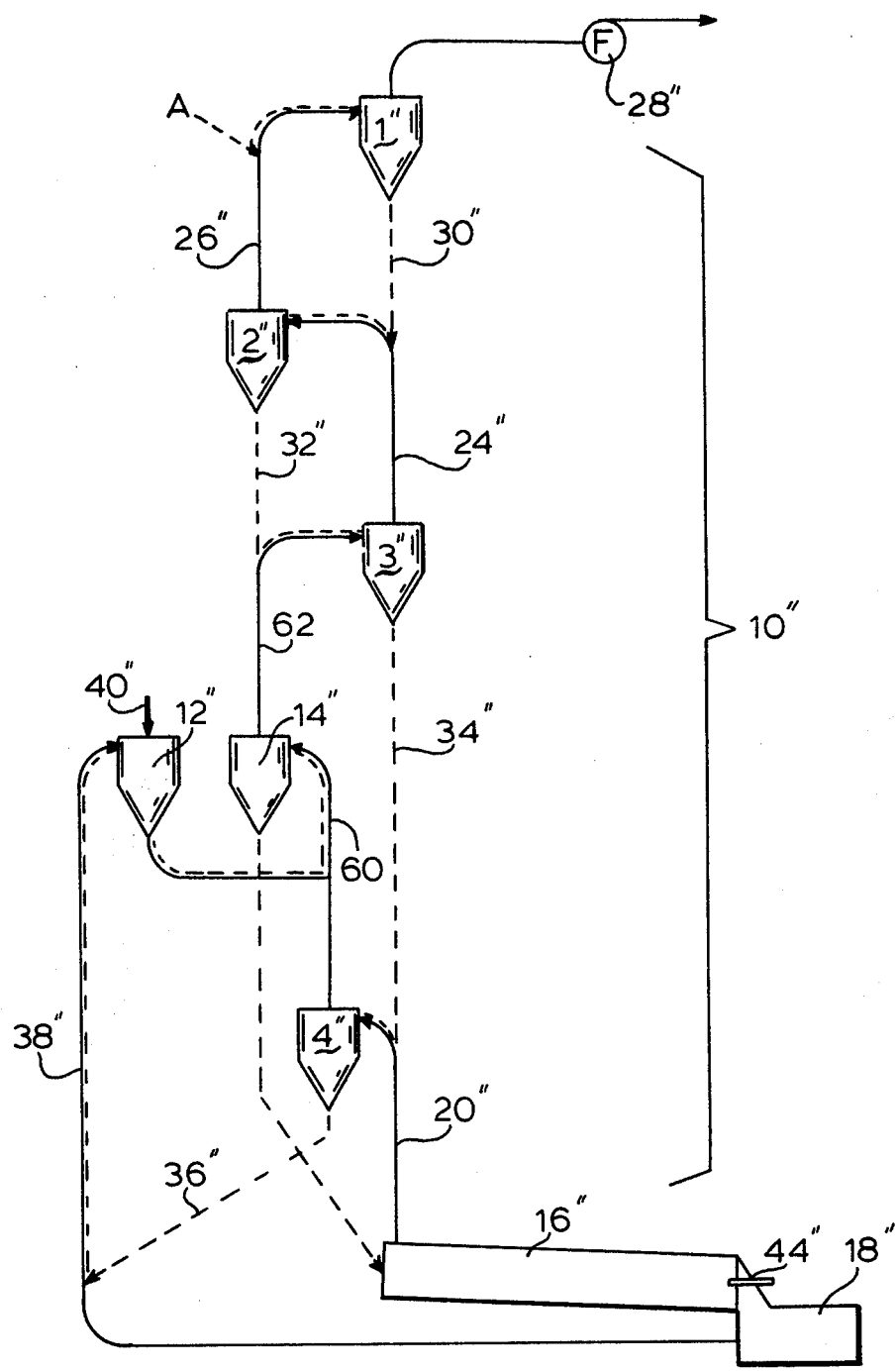

The above and other objects, advantages and features of the present invention will become more apparent from the following detailed description of three now preferred embodiments thereof, taken in conjunction with the accompanying schematic flow diagram drawing wherein FIGS. 1, 2 and 3 diagrammatically illustrate respective ones of the embodiments of the installation for the dry manufacture of cement.

To avoid redundancy in the description, like reference numerals designate like parts operating in an equivalent manner in all figures, the reference numerals in FIG. 2 showing the second embodiment being primed and the reference numerals in FIG. 3 showing the third embodiment being double-primed. In all figures, the flow of the hot air and smoke gases is shown in full lines and the counter-current flow of the cement raw material is shown in broken lines.

Referring now to the drawing and first to FIG. 1, there is shown an installation for the dry manufacture of cement, which comprises clinkerization kiln 16 having inlet 15 for precalcined cement raw material, outlet 17 for clinker produced in the kiln from the precalcined cement raw material and outlet conduit 20 for smoke gas generated in the kiln during clinkerization, i.e. the conversion of the precalcined cement raw material into clinker. Cooling chamber 18 for the clinker has an inlet connected to the clinker outlet of kiln 16 and outlet conduit 38 for hot air generated in the cooling chamber during cooling of the clinker. Preheater heat-exchanged unit 10 is comprised of a plurality of cyclones series-connected in a circuit. In the illustrated embodiment, unit 10 is comprised of four cyclones 1, 2, 3 and 4, and last cyclone 4 of the preheater heat-exchange unit is connected to smoke gas outlet conduit 20 and receives smoke gas therefrom. The four cyclones are arranged at different levels and are supported by a tower. The smoke gas generated in kiln 16 is collected in a hood (not shown) whence conduit 20 removes the smoke gas and directs it to the inlet of last cyclone 4. The outlet of cyclone 4 is connected to the inlet of cyclone 3 preceding the last cyclone by conduit 22 and the outlet of the preceding cyclone is connected to the inlet of second cyclone 2 by conduit 24. The outlet of the second cyclone is connected to the inlet of next higher cyclone 1 and the outlet of cyclone 1 is connected to the input of exhaust fan 28 constituting a means for circulating a current of the smoke gas through the preheater heat-exchange unit circuit constituted by the cyclones and their connecting conduits in one direction, i.e. upwards, as indicated by the arrows. Thus, the smoke gas passes successively through the series of cyclones 4, 3, 2 and 1 and, after being cleaned in a precipitator for removing the dust particles from the smoke gas, the smoke gas is exhausted into the atmosphere.

Inlet A for finely divided cement raw material is connected to connecting conduit 26 for feeding the cement raw material into preheater heat-exchange unit 10 for counter-current flow therethrough. As indicated by the arrows at the broken lines, the raw material is carried by the smoke gas current in conduit 26 into cyclone 1 and conduit 30 delivers the material from the bottom outlet of cyclone 1 to connecting conduit 24 where the smoke gas current carries it into second cyclone 2. Conduit 32 attached to the bottom outlet of cyclone 2 is branched and conduit branch 32a delivers a fraction of the material to connecting conduit 22 where the smoke gas carries it into cyclone 3. Conduit 34 is attached to the bottom outlet of cyclone 3 and delivers the material into connecting conduit 20 where the smoke gas carries it into last cyclone 4. Finally, conduit 36 is attached to the bottom outlet of last cyclone 4 and delivers the preheated cement raw material into hot air outlet conduit 38.

Precalcination kiln 12 has an inlet connected to hot air outlet conduit 38 for receiving a portion of the hot air from cooling chamber 18 and the preheated raw material from unit 10. This kiln is constituted by a chamber with a vertical axis and having an upper cylindrical part and a lower conical part. Its inlet is arranged tangentially in the upper part so that conduit 38 connected therefrom delivers the hot air tangentially into kiln 12 to be utilized therein as combustion air for the fuel injected into the kiln at 40. Another portion of the hot air from cooling chamber 18 is fed back into clinkerization kiln 16 as secondary air, the fuel being injected into kiln 16 at 44. The finely divided cement raw material introduced into the installation at A flows therethrough in suspension while being preheated and separated from the smoke gas in the cyclones in a counter-current flow, the preheated material separated from the smoke gas being carried by the hot air in conduit 38 into kiln 12 where it is precalcined in suspension, the heat from the burning fuel in kiln 12 assuring at least the partial decarbonization of the material. The precalcination kiln has an axially extending bottom outlet for the precalcined cement raw material and smoke gas generated during precalcining.

Another cyclone 14 has an inlet connected to the outlet of precalcination kiln 12 for receivng the precalcined material and smoke gas therefrom and for separating the precalcined cement raw material from the smoke gas. Cyclone 14 has outlet conduit 42 for the smoke gas connected to the preheater heat-exchange unit at a point downstream of last cyclone 4 in the one direction. In the embodiment of FIG. 1, outlet conduit 42 is connected to the inlet of cyclone 3 preceding last cyclone 4. An outlet of cyclone 14 at the bottom thereof is connected to inlet 15 of clinkerization kiln 16 for delivering the precalcined material freed of smoke gas to kiln 16. The smoke gases from kilns 12 and 16 are utilized in the circuit for preheating the cement raw material therein.

As shown in FIG. 1, conduit branch 32b carries another fraction of the material coming from cyclone 2 into connecting conduit 42 where the smoke gas from cyclone 14 carries it into cyclone 3 of unit 10.

The clinkerization kiln is a tubular rotary kiln heated by a downstream burner 44 and receiving secondary air from cooling chamber 18. It is necessary for the proper functioning of the installation to distribute the hot air from cooling chamber 18 in well determined proportions to kilns 12 and 16. Generally, 40 to 45% of the total hot air flow are utilized in clinkerization kiln 16 and 55 to 60% of this air flow is utilized in precalcination kiln 12. Since only a single means 28 is used for circulating the gases through kiln 16 and the preheater circuit, on the one hand, and kiln 12, on the other hand, the pressure losses in the two parallel paths of gas flow must be the same for the respective gas volumes therein. Since the cross section of kiln 16 is much larger than that of conduit 38, the present invention provides a device for creating a gas pressure loss in the circuit between last cyclone 4 of preheater heat-exchange unit 10 and the point where outlet conduit 42 of cyclone 14 is connected to the preheater circuit. In the embodiment of FIG. 1, this device is constituted by constriction 46 in conduit 22 connecting last cyclone 4 to preceding cyclone 3. The cross section of constriction 46 is so selected as to obtain the desire pressure loss, i.e. the predetermined gas flow distribution in kilns 12 and 16.

It will be noted that the location of constriction 46 is in a preheating zone where the temperature of the smoke gas is relatively low, which will avoid the formation of wall deposits in the conduit and, therefore, will not interfere with the operation of the installation.

The embodiment shown in FIG. 2 differs from the above-described embodiment in that the device for creating a gas pressure loss in the circuit between last cyclone 4' of preheater heat-exchange unit 10' and the point where outlet conduit 42' is connected to the circuit comprises supplementary cyclone 50 arranged in the circuit between the last cyclone and preceding cyclone 3'.

As shown, connecting conduit 52 leads from smoke gas outlet of last cyclone 4' to the inlet of supplementary cyclone 50 and connecting conduit 54 leads from the smoke gas outlet of cyclone 50 to preceding cyclone 3'. The preheated raw material leaves preceding cyclone 3' through conduit 34' which is connected to connecting conduit 52 where the material is carried back into cyclone 50. The characteristics of supplementary cyclone 50 are so selected as to obtain the desired distribution of the gas flows in the manner explained hereinabove in connection with FIG. 1. In all other respects, the installation of FIG. 2 operates in a manner equivalent to that of FIG. 1.

In the embodiment of FIG. 3, other cyclone 14, which receives the precalcined cement raw material and smoke gas from precalcination kiln 12, is itself arranged in the circuit of preheater heat-exchange unit 10 between last cyclone 4" and preceding cyclone 3 of the unit, and this other cyclone constitutes the device for creating a gas pressure loss in the circuit at the desired point. As shown, connecting conduit 60 delivers the smoke gas from last cyclone 4" as well as the smoke gas and precalcined cement raw material from kiln 12" to cyclone 14", and the smoke gas from this cyclone is carried by connecting conduit 62 to preceding cyclone 3". The characteristics of cyclone 14" will determine the distribution of the gas flow in the above-described manner.

While the invention has been described in connection with certain now preferred embodiments, it will be understood that many modification and variations may occur to those skilled in the art, particularly after benefiting from the present disclosure, the scope of this invention being defined by the appended claims.

What is claimed is:

1. An installation for the dry manufacture of cement, which comprises
   (a) a clinkerization kiln having an inlet for precalcined cement raw material, an outlet for clinker produced in the kiln from the precalcined cement raw material and an outlet conduit for smoke gas generated in the kiln during the clinkerization,
   (b) a cooling chamber for the clinker having an inlet connected to the clinker outlet of the kiln and an outlet conduit for hot air generated in the cooling chamber during cooling of the clinker,
   (c) a preheater heat-exchange unit comprised of a plurality of cyclones series-connected in a circuit and including a last one of the cyclones, the preheater heat-exchange unit being connected to the smoke gas outlet conduit and receiving the smoke gas therefrom,
   (d) means for circulating a current of the smoke gas through the preheater heat-exchange unit circuit in one direction,
   (e) means for feeding the cement raw material into the circuit for counter-current flow therethrough,
   (f) a precalcination kiln having an inlet connected to the hot air outlet conduit for receiving hot air and the preheated cement raw material, the hot air received in the precalcination kiln being utilized therein as combustion air, the preheated cement raw material being precalcined in suspension in the precalcination kiln and the precalcination kiln having an outlet for the precalcined cement raw material and smoke gas generated during precalcining,
   (g) another cyclone having an inlet connected to the outlet of the precalcination kiln for receiving the pecalcined cement raw material and smoke gas therefrom and for separating the precalcined cement raw material from the smoke gas, the other cyclone having an outlet conduit for the smoke gas connected to the circuit at a point downstream of the last cyclone of the preheater heat-exchange unit in the one direction, the smoke gases from the kilns being utilized in the circuit for preheating the cement raw material therein, and
   (h) a device for creating a gas pressure loss in the circuit between the last cyclone of the preheater heat-exchange unit and said point.

2. The installation of claim 1, wherein the circuit comprises a conduit connecting the last cyclone to a preceding one of the cyclones of the preheater heat-exchange unit and the device is constituted by a constriction in said conduit.

3. The installation of claim 1, wherein the device comprises a supplementary cyclone arranged in the circuit between the last cyclone and a preceding one of the cyclones of the preheater heat-exchange unit.

4. The installation of claim 1, wherein the other cyclone is arranged in the circuit between the last cyclone and a preceding cyclone of the preheater heat-exchange unit, said other cyclone constituting said device.

5. An installation for the dry manufacture of cement, which comprises
   (a) a clinkerization kiln having an inlet for precalcined cement raw material, an outlet for clinker produced in the kiln from the precalcined cement raw material and an outlet conduit for smoke gas generated in the kiln during the clinkerization,
   (b) a cooling chamber for the clinker having an inlet connected to the clinker outlet of the kiln and an outlet conduit for hot air generated in the cooling chamber during cooling of the clinker,
   (c) a preheater heat-exchange unit comprised of a plurality of cyclones series-connected in a circuit and including a last one of the cyclones, the preheater heat-exchange unit being connected to the smoke gas outlet conduit and receiving the smoke gas therefrom, and the last cyclone having an outlet for the preheated cement raw material,
   (d) means for circulating a current of the smoke gas through the preheater heat-exchange unit circuit in one direction from the last cyclone,
   (e) means for feeding the cement raw material into the circuit for counter-current flow therethrough,
   (f) a precalcination kiln having an inlet connected to the hot air outlet conduit for receiving hot air in a current flowing in said one direction hot air in a current flowing in said one direction, the preheated cement raw material being fed into the hot air current flowing in the hot air outlet conduit, carried into the precalcination kiln in suspension in the hot air and precalcined therein, the precalcination kiln having an outlet for the precalcined cement raw material and smoke gas generated therein during precalcining,
   (g) another cyclone having an inlet connected to the outlet of the precalcination kiln for receiving the precalcined cement raw material and smoke gas therefrom and for separating the precalcined cement raw material from the smoke gas, the other cyclone having an outlet conduit for the smoke gas connected to the preceding cyclone of the preheater heat-exchange unit, the smoke gases from the kilns being utilized in the circuit for preheating the cement raw material therein, and
   (h) a constriction in the conduit connecting the last and preceding cyclones of the preheater heat-exchange unit.

6. The installation of claim 5, wherein a second one of the series-connected cyclones of the preheater heat-exchange unit downstream of the preceding cyclone in said direction has an outlet for the preheated cement raw material and the outlet of the second cyclone is connected to the conduit connecting the last and preceding cyclones for introducing at least a fraction of the preheated material from the second cyclone into the last-mentioned conduit downstream of the constriction in said direction.

7. The installation of claim 5, wherein a second one of the series-connected cyclones of the preheater heat-exchange unit down stream of the preceding cyclone in said direction has an outlet for the preheated cement raw material and the outlet of the second cyclone is connected to the smoke gas outlet conduit of the other cyclone for introducing at least a fraction of the preheated material from the second cyclone into the last-mentioned conduit.

* * * * *